Oct. 14, 1958  F. A. McDONALD  2,856,150
VALVE WITH A FLEXIBLE ROTOR
Filed May 13, 1957  3 Sheets-Sheet 1
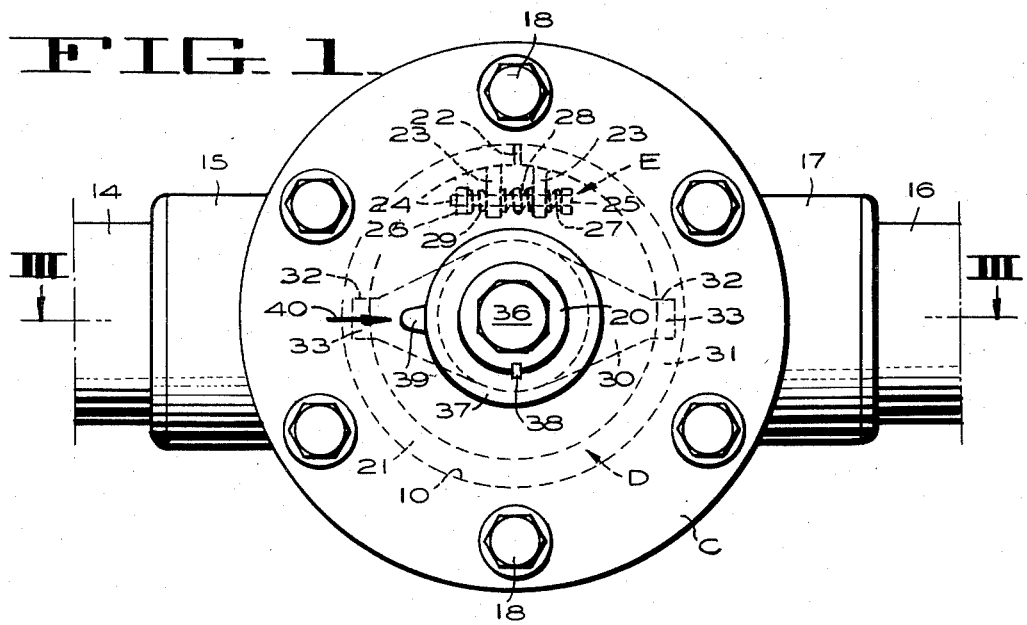
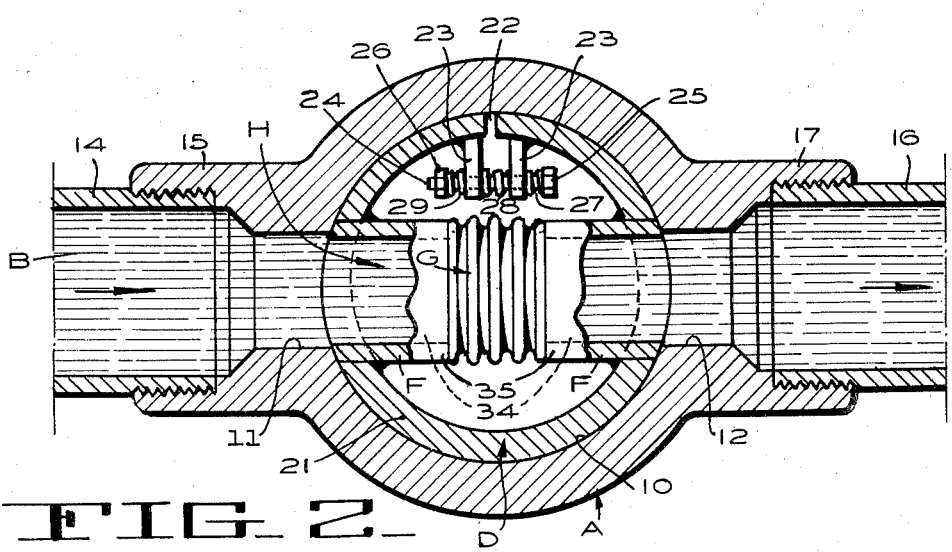
INVENTOR.
FRANK A. McDONALD
BY
Munn & Liddy
ATTORNEYS

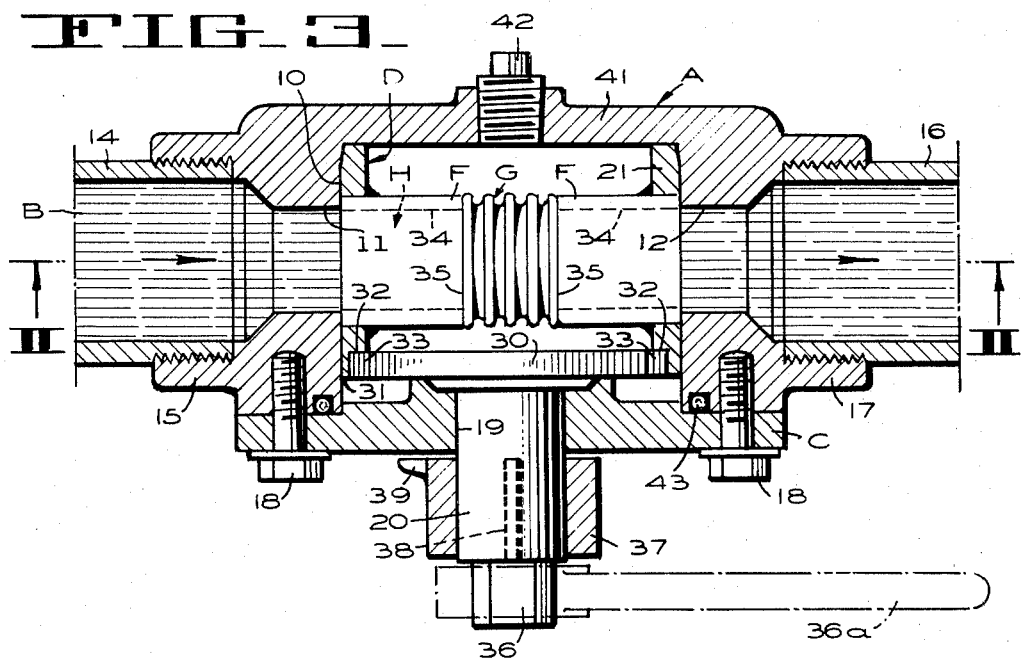
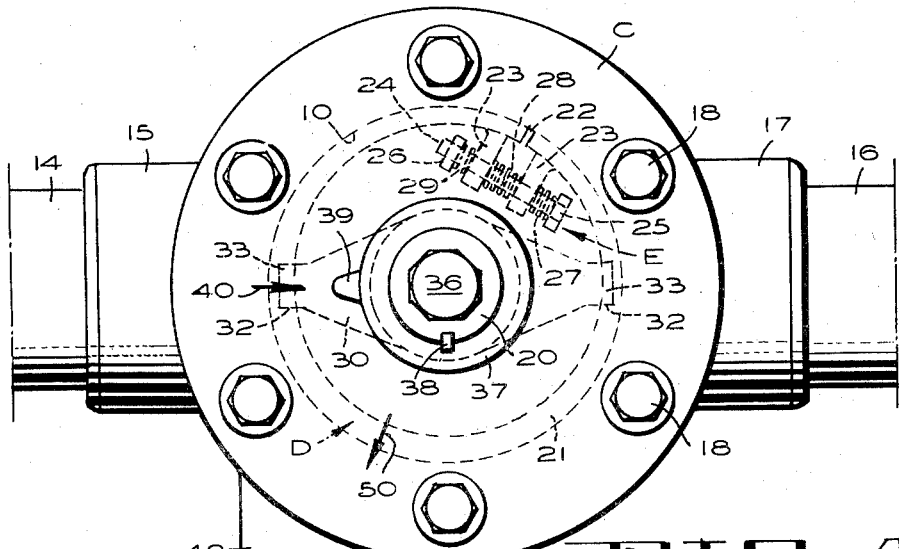

Oct. 14, 1958 F. A. McDONALD 2,856,150
VALVE WITH A FLEXIBLE ROTOR
Filed May 13, 1957 3 Sheets-Sheet 3
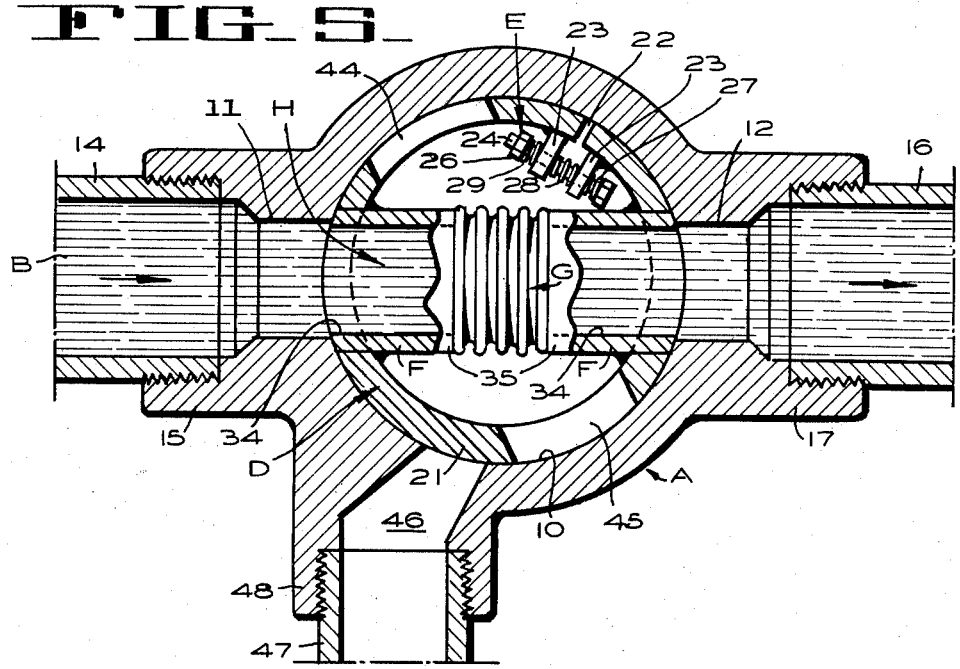
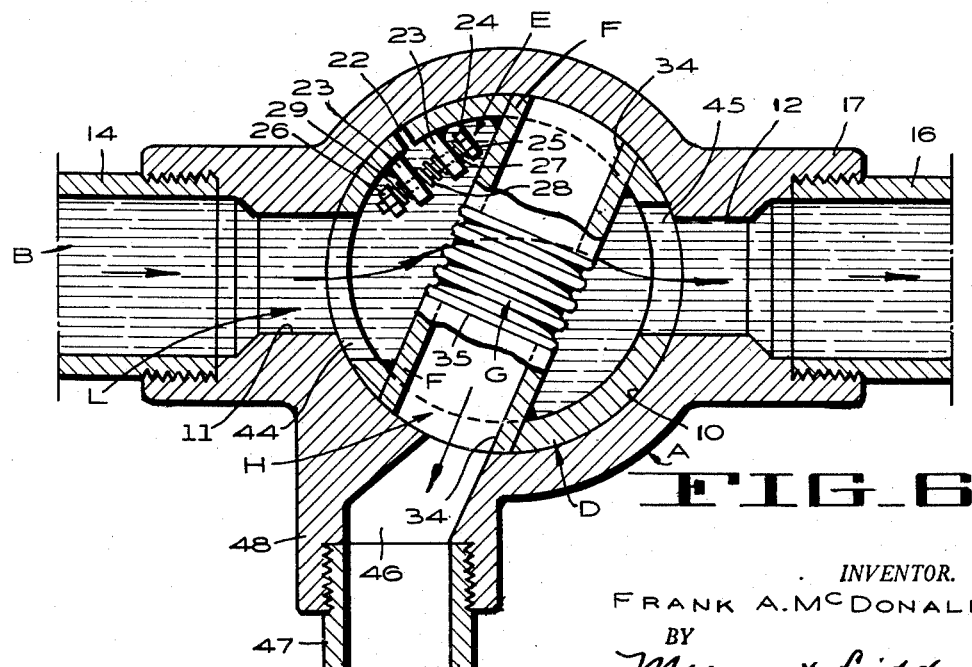
INVENTOR.
FRANK A. McDONALD
BY
Munn & Liddy
ATTORNEYS

United States Patent Office 2,856,150
Patented Oct. 14, 1958

2,856,150
VALVE WITH A FLEXIBLE ROTOR
Frank A. McDonald, Los Angeles, Calif.

Application May 13, 1957, Serial No. 658,614

8 Claims. (Cl. 251—175)

The present invention relates to improvements in a valve with a flexible rotor. It consists of the combinations, constructions and arrangements, as hereinafter described and claimed. It embodies improvements over the sample-taking valve shown in the copending application of Frank A. McDonald (applicant herein) and Willis T. Holmes, Serial No. 580,077, which was filed in the United States Patent Office on April 23, 1956. However, the present disclosure is not limited to sample-taking valves, and the valves herein shown are subject to a wide variety of uses.

In the above-identified copending application there is shown a sample-taking valve, which normally will permit a flow of a liquid through a passageway of a rotor, without undue restriction. As illustrated therein, when the rotor is turned for shutting off the normal passageway through the rotor, an auxiliary or secondary passageway is made available to permit the unhindered flow of the liquid through the valve casing.

Moreover, the rotor in the copending case is operable to allow a full sample of a complete cross-sectional area of the liquid to be trapped and transferred to a sample-taking container. For example, when the valve is used in the petroleum industry, the water-oil ratio may be determined from the sample from time to time.

Certain field problems were encountered with the sample-taking valves shown in the copending case, resulting from changes in temperatures, which caused the rotor to "freeze" or bind in its casings due to the expansion of the rotor.

Accordingly, and as one of the objects of the present invention, it is proposed to provide a valve with a flexible rotor. The rotor is designed in such a manner that it may be rotated on its seat at all times without any binding action, and still the rotor is held in liquid-tight relation relative to its seat. This same principle may be used on various types of valves; and, as previously indicated, it is not to be limited to sample-taking valves.

More specifically stated, I provide a rotor having a wall-defining skirt which is split lengthwise thereof so that it may flex relative to the casing so as to preclude binding of the rotor on its seat. Yielding means are provided which are operable to constrict the skirt. The pressure of the liquid flowing through the valve is utilized to urge the skirt to expand so that it will have a liquid-tight relation with the seat. The rotor is provided with a pair of conduits which are arranged to communicate with inlet and outlet ports of the casing; and these conduits extend inwardly relative to the skirt, and have a flexible tubular bellows interposed between their inner ends and sealed thereto. These conduits and the bellows coact to provide a liquid passageway extending through the rotor. The pressure of the liquid causes to bellows to elongate in length, thereby urging the skirt to expand against its seat.

Other objects and advantages will appear as the specification continues. The novel features will be particularly pointed out in the appended claims.

Drawings

For a better understanding of the invention, reference should be had to the accompanying drawings, forming part of this application, in which:

Figure 1 is a side elevational view of a valve with a flexible rotor, embodying this invention;

Figure 2 is a vertical longitudinal sectional view taken through this same valve along the axes of the inlet and outlet pipes, the section being indicated by the plane II—II in Figure 3;

Figure 3 is a horizontal sectional view taken along the plane III—III of Figure 1;

Figure 4 is a front elevational view of a modification, illustrating a sample-taking valve, it being noted that Figure 3 will constitute a horizontal sectional view through the inlet and outlet pipes of Figure 4;

Figure 5 is a vertical sectional view taken through the sample-taking valve of Figure 4, with the rotor being shown to confine the flow of liquid from the inlet to the outlet pipes; and Figure 6 is a view similar to Figure 5, but disclosing the rotor turned into a sample-taking position.

While I have shown only the preferred forms of my invention, it should be understood that various changes, or modifications, may be made within the scope of the annexed claims without departing from the spirit thereof.

Detailed description

Referring now to the first embodiment of my valve with a flexible rotor, as illustrated in Figures 1 to 3, inclusive, of the drawings, it will be noted that I provide a hollow casing indicated generally at A. This casing has a rotor seat 10 therein, which may be cylindrical or conical depending upon the shape of rotor utilized. The casing is provided with inlet and outlet ports 11 and 12, respectively, which communicate with the seat 10. As shown, an inlet pipe 14 is threaded into a coupler 15 at one side of the casing A so as to deliver liquid B to the inlet port 11. At the opposite side of the casing there is provided an outlet pipe 16, which is connected by threads to a coupler 17, the latter placing the pipe 16 in communication with the outlet port 12 of the casing.

A bonnet C is removably secured by studs 18 to the casing A to provide a closure over the interior of the casing (see Figure 3). The rotor is indicated generally at D and it is mounted on the interior of the casing for rotation on the seat 10. It will be seen that the bonnet C has a bore 19 therein, and that a shank 20 is rotatably disposed in this bore, with the shank extending beyond the exterior of the bonnet C for operation.

As to the structural features of the rotor D, it has a wall-defining skirt 21 which is split lengthwise thereof at 22 so that it may flex relative to the casing A so as to preclude binding of the rotor on the seat 10. I provide adjustable yielding means, designated generally at E, that engage with the skirt 21, and operable to constrict the latter. These means include an apertured lug 23 provided on the skirt on each side of its split 22. Also, it includes a bolt 24 that slidably extends through the apertures of the lugs 23, the bolt having a head 25 on one end thereof and an adjustable nut 26 on its other end. A first compression spring 27 interposed between one of the lugs 23 and the bolt head 25; a second compression spring 28 is interposed between the two lugs 23; and a third compression spring 29 is interposed between the other lug 23 and the nut 26.

The rotor D is preferably made of bronze and it has a natural tendency to open up slightly at its split 22. In order to encourage the rotor to thus open up and thereby hug the seat 10, the wall of the skirt is made thinner on its split side than on the side opposite the split, which is clearly shown in the drawings. When the rotor is installed, the nut 26 may be adjusted so that the rotor D may be turned easily relative to the casing A under the temperatures expected to be encountered.

For the purpose of imparting turning movement to the rotor D when the shank 20 is rotated, I provide an arm 30 that is secured to the inner end of the shank (see Figure 3). The wall of the skirt 21 has a rim 31 facing toward the bonnet C, and this rim has a pair of notches 32 fashioned therein. The arm 30 has its opposite ends 33 removably disposed in these notches, whereby the arm may be disengaged from the rotor D when the bonnet C is removed from the casing A.

It will be noted that a pair of conduits F are carried by the rotor D, each having a bore 34 communicating with the exterior of the rotor. These conduits extend inwardly of the skirt and have their inner ends 35 spaced from one another. A flexible tubular bellows G (which may be made of stainless steel) is interposed between the conduits and sealed to the inner ends 35 of the latter. The conduits F and the bellows G coact to provide a liquid passageway H extending through the rotor. This passageway is disposed to communicate with the inlet and outlet ports 11 and 12, respectively, when the rotor is turned to bring this passageway into registration with these ports, as shown in Figures 2 and 3.

The bellows are made to elongate in length, when liquid B under pressure is flowing through the passageway H. Also, this liquid pressure will exert a thrust against the ends 35 of the conduits F, tending to urge these ends apart. The result is that the split skirt 21 will be urged to expand against the seat 10 to maintain a liquid-tight relation therewith.

In order to impart rotary movement to the rotor D, I have provided a non-circular projection 36 on the outer end of this shank. As suggested in Figure 3, wrench 36a may be applied to the projection 36 for turning the rotor. Of course, the shank 20 may be turned by an automatic mechanism (not shown), which will actuate the rotor at predetermined time intervals, for the purpose that will be mentioned in more detail in connection with the sample-taking valve (shown in Figures 4 to 6, inclusive).

It will be appreciated, of course, that when the passageway H is turned out of registration with the ports 11 and 12, the flow of the liquid through the rotor D will be cut off. In order to inform the operator of the location of the passageway H relative to the inlet port 11, I have provided a collar 37 on the end of the shank 20 that projects beyond the bonnet C. This collar may be fixed to the shank by a key 38, and the collar has a pointer 39. A suitable index, such as an arrow 40, is provided on the bonnet C. When the pointer 39 registers with this arrow, as in Figure 1, the operator will be informed of the fact that the passageway H is in full registration with the ports 11 and 12.

For the purpose of allowing the hollow interior of the casing to be drained and cleaned, a rear wall 41 of the casing A has been provided with a removable plug 42, as shown in Figure 3 of the drawings. A suitable sealing gasket 43 may be interposed between the casing A and the bonnet C.

Referring now to Figures 4 to 6, inclusive, I have shown a sample-taking valve therein. It is very similar to the valve previously described, with the exception that the rotor D has been modified to provide by-pass openings 44 and 45 therein; and by adding a sample-taking port 46 to the casing A, this port being placed in communication with a sample-taking container J. Like reference characters have been applied to corresponding parts of the two embodiments of the invention.

As previously mentioned, Figure 3 may be considered as being a horizontal sectional view taken through the axes of the inlet pipe 14 and the outlet pipe 16 of Figure 4.

In the disclosure made in Figures 5 and 6, the passageway H provided by the conduits F and the tubular bellows G will be referred to as being a "primary passageway"; while the openings 44 and 45 and the hollow interior of the rotor D define a "secondary passageway," which has been designated at L in Figure 6.

It will be apparent from Figure 5 that when the rotor D is turned to bring the conduits F into full registration with the ports 11 and 12, the primary passageway H constitutes the only means of communication between these ports, and thus the liquid will flow from the inlet pipe 14 to the outlet pipe 16. The sample-taking port 46 is provided in a lower part of the casing A. When the rotor is turned for moving the primary passageway H from a position communicating with the inlet and outlet ports 11 and 12, respectively (see Figure 5), into a position wherein the primary passageway H has its lower end communicating with the sample-taking port 46, the liquid contents in this primary passageway will flow through the port 46. The latter has a pipe 47 connected thereto by a coupler 48 that forms part of the casing A. The pipe 47 carries a cover 49 to which the container J is removably secured. Although I have shown the rotor D as being rotatable about a horizontal axis, it could be turned about a vertical axis; and, in such a case, the contents of the primary passageway H still would flow into the pipe 47. The latter could be provided with an elbow therein so that the container J would receive the liquid contents from the primary passageway H.

It will be observed from Figure 5 that the by-pass openings 44 and 45 in the rotor D are located so as to move into communication with the inlet ports 11 and 12, respectively, prior to the time that the primary passageway H moves out of communication with these ports. Accordingly, the flow of liquid B from the inlet port 11 to the outlet port 12 (by way of the secondary passageway L) will be permitted as the rotor D moves toward sample-taking position (see Figure 6). It will be apparent that when the rotor D initially is turned in a counterclockwise direction in Figure 5, the point will be reached where the liquid F will be flowing through both the primary passageway H and the secondary passageway L.

A suitable index, such as an arrow 50, has been provided on the bonnet C with which the pointer 39 will register, when the rotor D has been turned into sample-taking position (Figure 6). As one use of my sample taking valve, it may be used in the oil industry where the water-oil ratio must be determined at intervals. In such a case, automatic means may be provided for turning the rotor D at the preselected time intervals.

I claim:

1. In a valve with a flexible rotor: a hollow casing having a rotor seat fashioned on the interior thereof; the casing being provided with inlet and outlet ports, which communicate with the seat; a rotor mounted on the seat for rotation; the rotor having a wall-defining skirt which is split lengthwise thereof so that it may flex relative to the casing so as to preclude binding of the rotor on the seat; a pair of conduits carried by the rotor, each having a bore communicating with the exterior of the rotor; these conduits extending inwardly of the skirt and having inner ends spaced from one another; a flexible tubular bellows sealed to the inner ends of the conduits; the conduits and the bellows providing a liquid passageway disposed to communicate with the inlet and outlet ports when the rotor is turned to bring this passageway into registration with said ports; the bellows being made to elongate in length, when liquid under pressure is flowing through said passageway, to thereby urge the skirt to expand against the seat; and means operable to turn the rotor.

2. The valve with a flexible rotor, as defined in claim 1; and in which adjustable yielding means engage with the skirt and operable to constrict the latter.

3. The valve with a flexible rotor, as defined in claim 1; and in which the inlet and outlet ports of the casing are disposed on diametrically opposite sides of the rotor seat; and the passageway provided by the conduits and bellows extends diametrically across the rotor.

4. The valve with a flexible rotor, as defined in claim 1; and in which an apertured lug is provided on the skirt on each side of its split; a bolt extending through the apertures of the lugs; the bolt having a head on one end thereof and an adjustable nut on its other end; a first compression spring interposed between one of the lugs and the bolt head; a second compression spring interposed between the lugs; and a third compression spring interposed between the other lug and the nut.

5. The valve with a flexible rotor, as defined in claim 1; and in which the wall of the skirt is made thinner on its split side than on the side opposite the split to thereby facilitate flexing of the skirt.

6. In a valve with a flexible rotor: a hollow casing having a rotor seat fashioned on the interior thereof; the casing being provided with inlet and outlet ports, which communicate with the seat; a rotor mounted on the seat for rotation; the rotor having a wall-defining skirt which is split lengthwise thereof so that it may flex relative to the casing so as to preclude binding of the rotor on the seat; a pair of conduits carried by the rotor, each having a bore communicating with the exterior of the rotor; these conduits extending inwardly of the skirt and having inner ends spaced from one another; a flexible tubular bellows sealed to the inner ends of the conduits; the conduits and the bellows providing a liquid passageway disposed to communicate with the inlet and outlet ports when the rotor is turned to bring this passageway into registration with said ports; the bellows being made to elongate in length, when liquid under pressure is flowing through said passageway, to thereby urge the skirt against the seat; a bonnet removably secured to the casing to provide a closure over the interior of the casing; the bonnet having a bore therein; a shank rotatably disposed in the bore of the bonnet and projecting beyond the exterior of the bonnet for operation; the wall of the skirt having a rim facing toward the bonnet, and this rim having a pair of notches fashioned therein; and an arm secured to the inner end of the shank for rotation by the latter; the arm having ends removably disposed in the notches, whereby the arm may be disengaged from the rotor when the bonnet is removed from the casing.

7. In a valve with a flexible rotor: a hollow casing having a rotor seat fashioned on the interior thereof; the casing being provided with inlet and outlet ports, which communicate with the seat; a rotor mounted on the seat for rotation; the rotor having a wall-defining skirt which is split lengthwise thereof so that it may flex relative to the casing so as to preclude binding of the rotor on the seat; a pair of conduits carried by the rotor, each having a bore communicating with the exterior of the rotor; these conduits extending inwardly of the skirt and having inner ends spaced from one another; a flexible tubular bellows sealed to the inner ends of the conduits; the conduits and the bellows providing a primary liquid passageway disposed to communicate with the inlet and outlet ports, when the rotor is turned to bring the conduits into full registration with said ports, at which time the primary passageway constitutes the only means of communication between said ports; the bellows being made to elongate in length, when liquid under pressure is flowing through the primary passageway, to thereby urge the skirt to expand against the seat; the casing also having a sample-taking port; the wall of the skirt having a portion closing the sample-taking port, when said primary passageway is in communication with the inlet and outlet ports; said rotor being rotatable for moving said primary passageway from a position communicating with the inlet and outlet ports into a position wherein this passageway will communicate with the sample-taking port, whereby the liquid contents of said primary passageway of the conduits and bellows will flow through the sample-taking port; the wall of the skirt having a pair of by-pass openings disposed to register with the inlet and outlet ports, when the rotor is arranged in sample-taking position, whereby a secondary passageway is provided through the rotor for the unimpeded flow of liquid between the inlet and outlet ports when the rotor is in sample-taking position; and means operable for turning the rotor.

8. The valve with a flexible rotor, as defined in claim 7; and in which the by-pass openings in the rotor are located so as to move into communication with the inlet and outlet ports of the casing prior to the time the passageway of the conduits and bellows moves out of communication with the inlet and outlet ports, whereby the flow of liquid between these ports will not be precluded as the rotor is moved toward the sample-taking position.

References Cited in the file of this patent
UNITED STATES PATENTS

| | | |
|---|---|---|
| 1,160,342 | Taft | Nov. 16, 1915 |
| 2,432,225 | Carbon | Dec. 9, 1947 |
| 2,511,477 | Mueller | June 13, 1950 |